July 17, 1962    R. C. CALE    3,044,083
METHOD OF MANUFACTURING PLANING HULLS
Filed May 27, 1959    3 Sheets-Sheet 1
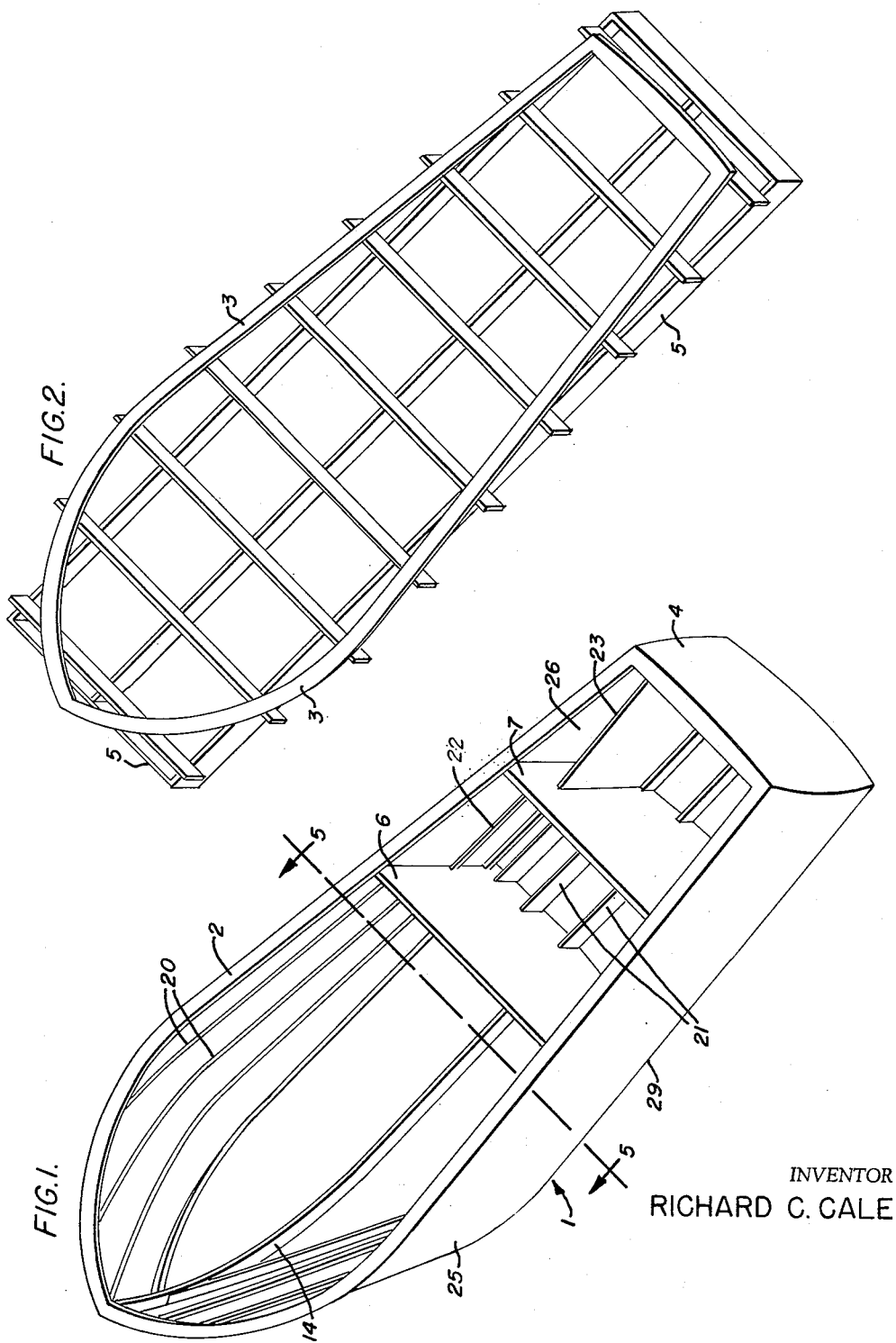
INVENTOR
RICHARD C. CALE July 17, 1962  R. C. CALE  3,044,083
METHOD OF MANUFACTURING PLANING HULLS
Filed May 27, 1959  3 Sheets-Sheet 2

INVENTOR
RICHARD C. CALE

July 17, 1962 R. C. CALE 3,044,083
METHOD OF MANUFACTURING PLANING HULLS
Filed May 27, 1959 3 Sheets-Sheet 3

INVENTOR
RICHARD C. CALE 3,044,083
METHOD OF MANUFACTURING
PLANING HULLS
Richard C. Cale, Sacramento, Calif.
(3010 Duluth St., West Sacramento, Calif.)
Filed May 27, 1959, Ser. No. 816,262
9 Claims. (Cl. 9—6)

This invention relates to improvements in laminated structural material and the method of making and using the same, and more particularly in the method of making high speed planing hulls of these laminated materials.

In high speed planing boats it is highly desirable to maintain a large bottom area so as to have a great planing surface. It has additionally been found that the shape of the chine of the planing hull can have a considerable affect on the planing and lifting qualities of the boat. The chine, in addition to increasing the planing surface may also increase the overall lift of the hull if designed properly. In the past many attempts have been made to construct an inexpensive boat having the desired planing characteristics required for high speed hulls while using the laminae construction technique. Due to the construction difficulties existing prior to this invention this molding technique usually resulted in a boat having a rounded hull instead of the desirable flat planing surface, particularly at the midsection of the ship. To overcome this undesirable hull shape, chines have been added after the completion of the molded hull by separately prefabricating the chine itself and attaching it to the hull by a means such as screws piercing the hull. Such a construction is undesirable not only in the necessity of prefabricating the separate chine but also due to the fact that the chine may work loose in which case water may enter the hull through the openings created by the screws.

Accordingly, it is an object of this invention to provide an inexpensive method of manufacturing planing craft having extremely high seaworthiness.

It is another object of this invention to provide a method of manufacture of high speed planing hulls having laminae construction.

A further object of this invention is to provide a method of manufacturing high speed planing hulls having an improved integral chine for providing additional lift.

A still further object of this invention is to provide a special jig upon which the planing hull is manufactured in an inverted position from the gunwale upward to the keel.

Still another object of this invention is to provide a method of manufacturing high speed planing hulls using improved techniques of lamination which includes the use of a fibre glass material.

The above objects and advantages of the invention will be more readily apparent from the following description when read in connection with the accompanying drawings, wherein is shown an embodiment of the invention, but it is to be understood that changes, variations and modifications can be resorted to within the scope of the claims hereunto appended.

In the drawings wherein like reference characters denote corresponding parts throughout the several views;

FIG. 1 is a perspective view of the completed hull structure of the invention;

FIG. 2 is a side elevation of the jig prior to the mounting of the hull structure;

Figure 3:
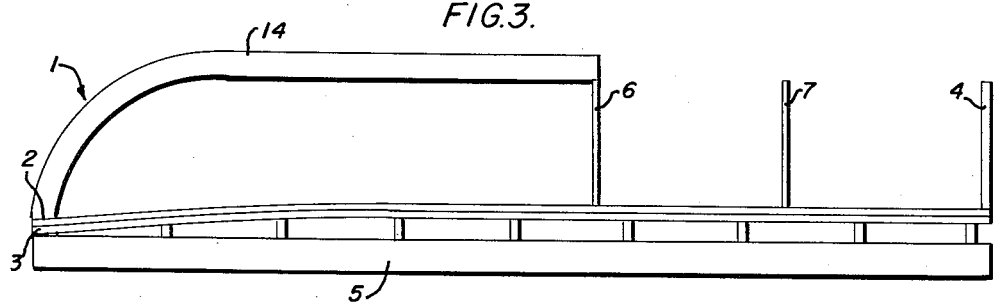
FIG. 3 is a side elevation showing the jig with the gunwale, permanent athwartship bulkheads and keelson in place.
Figure 4:
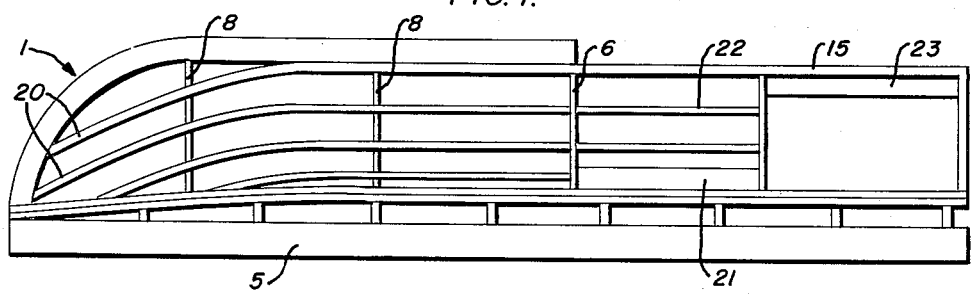
FIG. 4 is a side elevation similar to FIG. 3 with the addition of the stringers and temporary bulkheads.

Turning now to the details of the drawings, FIG. 1 shows the completed hull structure 1 including gunwale 2, transom 4, sides 25, engine compartment bulkheads 6 and 7, keelson 14, forward stringers 20, engine compartment stringers 21 and extended chine 29.

FIG. 2 shows a specific embodiment of the jig of the present invention. A base 5 is provided which includes the structural cross members for supporting the hull 1 while under construction. A mounting member 3 is constructed upon the support members of the jig 5. The mounting member 3 is so constructed that it is a mirror-image of the desired shape of the outer deck member of the hull to be constructed. As can be seen from FIG. 3, the outer deck member 2 is removably formed onto mounting member 3. By following the lines of the mounting member 3 the exact size and shape of the desired outer deck member is easily and quickly obtained. The outer deck member itself is built up of alternating layers of plywood and a glass fibre material. This glass fibre material may either be a glass fibre cloth wherein a mastic is used to seal the cloth to the layers of wood or it may be of a resinous nature having glass fibre material impregnated therein. Unless otherwise stated it is to be understood that these two glass fibre materials are interchangeable throughout the construction of the hull.

After completion of the outer deck member, the transom 4 and the permanent bulkheads 6 and 7 are secured to the outer deck member 2. The transom and permanent bulkheads are prefabricated prior to the construction of the hull. The prefabricated keelson 14 is then secured between the bow of gunwale 2 and forward permanent bulkhead 6 as shown in FIG. 3.

Figure 6:
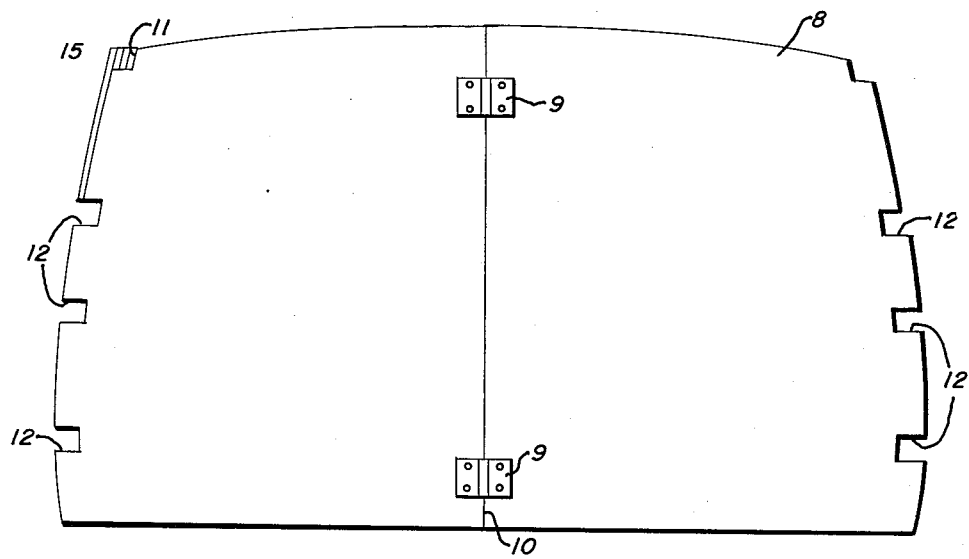
FIG. 6 is an elevation view of the structure of the temporary bulkheads.

The next step in the construction is the insertion of the temporary bulkheads 8. These temporary bulkheads are prefabricated, one such bulkhead being shown illustratively in FIG. 6. The bulkhead 8 is in two pieces which are hinged at 9. Each individual bulkhead is designed so as to fit in a vertical position between the outer deck member 2 and the keelson 14. Notches 11 and 12 are cut in either side of temporary bulkhead 8 for the reception of the reenforcement 15 and the stringers 20 as will appear more clearly as the description proceeds. Temporary bulkheads 8 are clamped or otherwise removably secured to the gunwale 2.

The transom 4, permanent bulkheads 6 and 7, temporary bulkheads 8 and outer deck member 2 provide the necessary support and outline structure for the reenforcing members 15. These reenforcing members 15 are laminated construction and extend from transom 4 forward to the forward part of keelson 14 and follow the lines of the chine on either side of the hull structure. The reenforcing members 15 include strake 18 which extends along the inner side of the hull toward the gunwale. This strake 18 extends to a point above the normal water line of the hull and is added for further protection against possible leakage of water into the hull. Reenforcing member 15 is shown sectionally in FIG. 6 as it rests on the slots of a temporary bulkhead. By following these slots 11 while fabricating the reenforcing member 15, the desired shape and alignment of the reenforcing member is easily attainable. The reenforcing member 15 is also made up of alternating layers of wood 16 and glass fibre material 17.

After the reenforcing members 15 are in place, the stringers 20 are attached between the forward permanent bulkhead 6 and the outer deck member 2 and between the forward bulkhead 6 and the keelson 14. By following the slots 12 of the temporary bulkheads 8, the stringers 20 form the desired shape of the bow and, as will be apparent, are quickly and easily installed. Additional bracing structures 22 are attached between the permanent bulkheads 6 and 7. Longitudinal bulkheads 23 are secured between transom 4 and permanent bulkhead 7 in order to create a space 26 for the installation of fuel tanks. The engine compartments stringers 21 are then placed between the permanent bulkheads 6 and 7 and are of sufficient size to insure proper structural strength in supporting the engines when installed in the hull.

The structure now represents a complete frame work of the outline of the desired lines of the hull and is ready for the construction of the planing bottom and the sides of the hull. The bottom planing surface is fabricated in a manner best shown by FIG. 5. Alternating layers of plywood and glass fibre material are placed on the keelson and the two outer reenforcing members and are formed so as to follow the outline created by transom 4, permanent bulkheads 6 and 7, keelson 14, temporary bulkheads 8 and reenforcing members 15. Each layer of the laminated planing surface 24 is continuous in the after planing surface, the inner and outer layers both being of plywood. The bow construction is made up of two laminated surfaces, one for each side of the bow. The number of layers used is dependent upon the structural strength desired. A good structural strength has been found to result from using three layers of plywood with the fibre glass material therebetween, although only two layers of plywood have been shown for purposes of clarity.

After the planing surface 24 has been secured in place to all permanent members, the next step is the construction of the sides 25 of the hull 1. These sides are of laminated construction and are built up in the same manner as the planing surface described above. The inner plywood surface of the sides is attached to the outer part of the outer deck member, the reenforcing structure 15 and the associated stringers. The side is so constructed as to extend beyond the outer surface of planing surface 24 in order to create an extended chine 29. This extended chine 29 continues in a gradually increasing extension from the forward part of the hull to a point aft of the amidship section of the hull. The extended chine 29 abruptly ends forward of the amidship section as is more clearly shown in FIG. 1, and a normal chine continues from that point to the bow.

A keel structure 28 is then mounted centrally on planing surface 24, and all lines of junction created by the assembling of the various members of the hull is coated by a resinous glass fibre material which can be applied either by a spray or by brush. This coating seals off all junctions and creates a waterproof hull structure.

Figure 5:
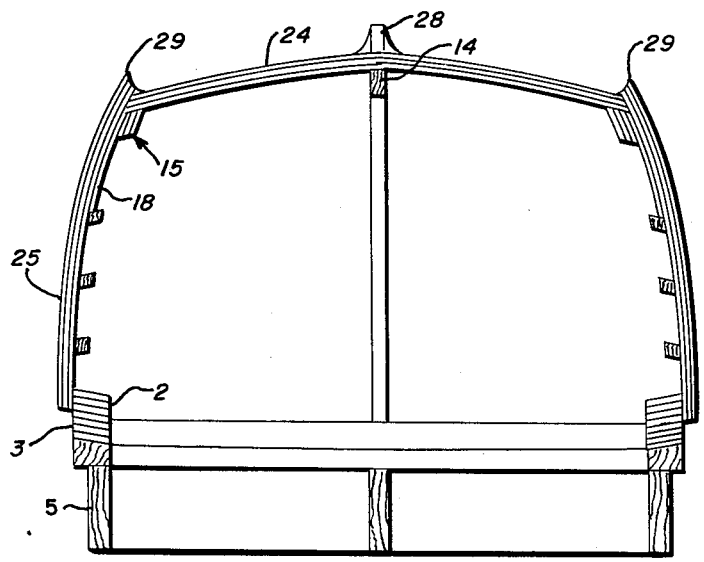
FIG. 5 is a sectional view looking forward along the lines of 5—5 of FIG. 1.
Figure 7:
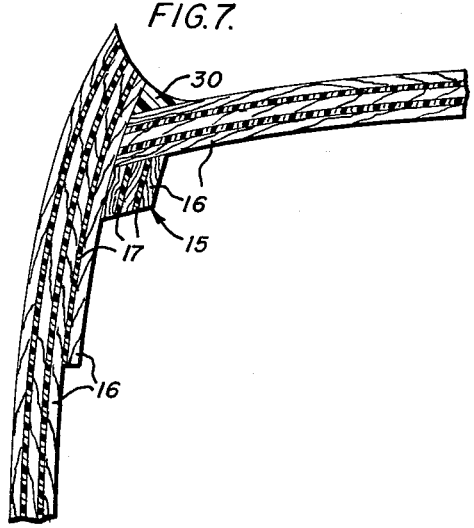
FIG. 7 is an enlarged sectional view of the junction of the planing surface and the side of the hull showing the reenforcing laminae and the chine structure.

The junction created by the keel and planing surface 24 is then filled with a glass fibre material which may be a glass fibre cloth soaked or impregnated with resinous glass fibre material. This filling is then formed so as to create a smooth concave surface as shown in FIG. 5. This concave surface causes the keel to cut the water smoothly and adds to the longitudinal stability of the craft. The junction 30 created by the extended chine 29 and the planing surface 24 is filled in like manner to that of the junction of the keel and the planing surface as described above, and is also formed so as to create a smooth concave surface, FIG. 7. The concave surface of the extended chine, in addition to adding to the longitudinal stability of the hull, diverts the lateral flow of the water into a downward direction, transferring the kinematic energy of the water into positive lift for the hull.

Upon completion of construction, the entire outer surface of the hull is coated with a resinous fibre glass material either by spraying or brushing it upon the hull. This, in effect, adds an additional layer to the laminated surface in addition to protecting the wood from the deleterious effects of the water.

The temporary bulkheads may now be removed by folding them inwardly upon the hinge members 9 and dropping them out of the whole structure. The hull is now complete and ready for the mounting of the engines, gas tanks and various additional devices as required. A forward deck could be put on the hull using the same manufacturing techniques as disclosed in the present invention.

As will now be apparent, this invention provides an inexpensive and simple method of manufacturing a completely water-proof high speed planing hull with improved chine construction.

What I claim is:

1. A method of building a planing hull in an inverted position which comprises constructing a jig having an upper member which is a mirror-image of the outer deck of said hull, forming and clamping the outer deck plank on said upper member, placing permanent and removable athwartship prefabricated bulkheads along said outer deck planking, forming a framing structure about said bulkheads, fabricating the sides and bottom of said hull on said framing structure and coating the exterior of said hull with a water-proof material.

2. The method of claim 1 wherein the temporary bulkheads are placed forward of the permanent bulkheads and are shaped so as to form mounting supports for the framing structure.

3. The method of claim 1 wherein the forming of the framing structure comprises the steps of extending a keelson from the bow of the outer deck member to the forward permanent bulkhead, extending stringers from the forward permanent bulkhead to the outer deck member, extending reinforcing laminated members extending along the line of the chine between the forward bulkhead and the keelson and mounting stringers between the permanent bulkheads.

4. The method of claim 1 wherein the fabricating of the sides and bottom of said hull comprises the steps of alternating layers of plywood and a fibre glass material, the inner layer being plywood.

5. The method of claim 4 further comprising, extending the sides from the outer deck member to a line beyond the outer edge of said bottom so as to form an extended chine.

6. A method of constructing a planing hull in an inverted position which comprises building a jig having an upper mounting member which is the mirror-image of the outer deck member of said hull, forming an outer deck member on said mirror-image, said outer deck member consisting of alternate layers of plywood and glass fibre material, securing prefabricated permanent bulkheads and transom to said outer deck member, attaching a plurality of removable prefabricated bulkheads to said outer deck member, forming a framing structure about said bulkheads and transom, fabricating the sides and bottom of said hull about said framing structure, said sides and bottoms consisting of alternate layers of plywood and a glass fibre material, and coating the exterior of said hull with a resinous glass fibre material.

7. The method of claim 6 wherein the forming of framing structure comprises the steps of extending a prefabricated keelson between the forward permanent bulkhead and the outer deck member, mounting a reinforcing member between the transom and the forward part of said keelson, said reinforcing member following the line of the chine, and extending a plurality of stringers forward from said forward bulkhead.

8. A method of making a high speed planing hull comprising the steps of building a jig having an upper surface which is the mirror-image of the desired outer deck member of said planing hull, forming an outer deck member on said mirror-image surface, fastening prefabricated permanent bulkheads and a transom to said outer deck member, attaching a plurality of prefabricated removable athwartship bulkheads to said outer deck member at spaced intervals thereon to form an outline of the hull structure, securing a prefabricated keelson between the bow of the outer deck member and the forward permanent bulkhead, fastening laminated reinforcing members along the line of the chine from the forward part of the keelson to the transom, said keelson and said reinforcing members contacting said bulkheads, forming stringers along the outline created by the temporary bulkheads and outer deck member, constructing the planing surface and the sides of said hull by alternating layers of plywood and glass fibre material, the inner layer of said planing surface being in engagement with the reinforcing members and the bulkheads, constructing the sides of said hull with alternating layers of plywood and glass fibre material, said sides extending from the outer deck member to a line beyond the planing surface, filling the junctions created by the sides and planing surface with a glass fibre material, forming said filling into a concave shape and coating the exterior of the hull with a resinous glass fibre material.

9. A method of building a planing hull in an inverted position which comprises constructing a jig having a member which is a mirror-image of the upper surface of said hull, forming and clamping said upper surface on said mirror-image member, placing athwartship prefabricated bulkheads along said upper surface, extending a keelson and stringers from the bow of said surface along said bulkheads, and mounting reinforcing members along the line of the chine between the bulkheads and keelson and stringers.

References Cited in the file of this patent

UNITED STATES PATENTS

| | | |
|---|---|---|
| 20,308 | Thompson | May 18, 1858 |
| 933,426 | Frost | Sept. 7, 1909 |
| 1,698,304 | Herreshoff | Jan. 8, 1929 |
| 2,372,521 | Sherman | Mar. 27, 1945 |
| 2,520,782 | Raveau | Aug. 29, 1950 |
| 2,522,037 | Hall | Sept. 12, 1950 |
| 2,563,923 | Crosby | Aug. 14, 1951 |
| 2,625,187 | Frees | Jan. 13, 1953 |
| 2,697,235 | Gronli et al. | Dec. 21, 1954 |
| 2,743,465 | Vogel | May 1, 1956 |
| 2,813,050 | Hickson | Nov. 12, 1957 |
| 2,941,216 | Carlson | June 21, 1960 |

FOREIGN PATENTS

| | | |
|---|---|---|
| 130,073 | Great Britain | July 31, 1919 |